United States Patent [19]

Littlefield

[11] Patent Number: 4,949,280

[45] Date of Patent: Aug. 14, 1990

[54] PARALLEL PROCESSOR-BASED RASTER GRAPHICS SYSTEM ARCHITECTURE

[75] Inventor: Richard J. Littlefield, Seattle, Wash.

[73] Assignee: Battelle Memorial Institute, Richland, Wash.

[21] Appl. No.: 192,218

[22] Filed: May 10, 1988

[51] Int. Cl.[5] .............................................. G06F 15/16

[52] U.S. Cl. ..................................... 364/518; 364/521

[58] Field of Search ............... 364/518, 521, 131, 133, 364/134, 200 MS File, 900 MS File; 370/60, 68, 89

[56] References Cited

U.S. PATENT DOCUMENTS

| | | | |
|---|---|---|---|
| 4,212,057 | 7/1980 | Devlin et al. | 364/134 X |
| 4,371,929 | 2/1983 | Brann et al. | 364/134 X |
| 4,523,273 | 6/1985 | Adams, III et al. | 364/200 |
| 4,644,461 | 2/1987 | Jennings | 364/133 X |
| 4,653,112 | 3/1987 | Ouimette | 364/134 X |
| 4,807,184 | 2/1989 | Shelor | 364/131 X |

OTHER PUBLICATIONS

Fuchs et al., "Fast Spheres, Shadows, Textures, Transparencies, and Image Enhancements in Pixel-Planes", *Computer Graphics*, vol. 19, No. 3, 111-120 (Jul. 1985).

Gupta et al., "As VLSI Architecture for Updating Raster-Scan Displays," *Computer Graphics*, vol. 15, No. 3, 71-78 (Aug. 1981).

Demetrescu, "Moving Pictures," *BYTE Magazine*, 207-217 (Nov. 1985).

Parke, "Simulation and Expected Performance on Multiprocessor Z-Buffer Systems", Computer Graphics, vol. 14, No. 3, 48-56 (Jul. 1980).

Tanimotor, "A Pyramidal Approach to Parallel Processing," Proceedings of the 10th Annual International Symposium on Computer Architecture, Stockholm (Jun. 1983), ACM reprint 0149-7111/83/0600/0372.

*Primary Examiner*—Gary V. Harkcom

*Assistant Examiner*—Mark K. Zimmerman

*Attorney, Agent, or Firm*—Klarquist, Sparkman, Campbell, Leigh & Whinston

[57] ABSTRACT

An apparatus for generating raster graphics images from the graphics command stream includes a plurality of graphics processors connected in parallel, each adapted to receive any part of the graphics command stream for processing the command stream part into pixel data. The apparatus also includes a frame buffer for mapping the pixel data to pixel locations and an interconnection network for interconnecting the graphics processors to the frame buffer. Through the interconnection network, each graphics processor may access any part of the frame buffer concurrently with another graphics processor accessing any other part of the frame buffer. The plurality of graphics processors can thereby transmit concurrently pixel data to pixel locations in the frame buffer.

10 Claims, 4 Drawing Sheets

PARALLEL PROCESSOR-BASED RASTER GRAPHICS SYSTEM ARCHITECTURE

BACKGROUND OF THE INVENTION

This invention was made with government support under Contract No. DE-AC06-76RLO 1830 awarded by the U.S. Department of Energy. The government has certain rights in this invention.

This invention relates generally to raster graphics systems, and more particularly, to a raster graphics system architecture based on multiple graphics processors operating in parallel, with unconstrained mapping of any processor to any pixel.

Raster graphics systems generally comprise a graphics processor and a frame buffer. The graphics processor processes graphics commands received from a host computer into pixel data that is stored in the frame buffer. The frame buffer, also known as a bit map or refresh buffer, comprises a memory in which the pixel data is stored at memory addresses corresponding to pixels on the display device such as a cathode ray tube (CRT) monitor or dot matrix printer. Displays are generated by the host computer initially transmitting graphics commands to the graphics processor. The graphics processor processes the commands into pixel data for storage at addresses in the frame buffer. The frame buffer is then read in raster scan fashion by the graphics processor and the pixel data is transmitted to the display device directly or through a lookup table. The pixel data is interpreted by the display device to control the intensity of the corresponding pixels on the display surface.

An important consideration in a raster graphics system is the speed at which displays can be generated. This speed is a function of the interface between the host computer and the graphics system, the processing of graphics commands, the transfer rate of pixel data into the frame buffer, and the rate at which the frame buffer can transfer pixel data to the display device. Any of these processing steps or communications between units is a potential bottleneck in generating raster images.

The primary drawback of present raster graphics systems is their relatively slow rate for generating displays in scientific applications. The rate is limited by the system internal architecture employed. This architecture generally comprises a pipeline of functional units, with early pipeline data being vector end points or polygon vertices from the host computer and the late pipeline data being pixel coordinates generated by the graphics processor. Conversion of end points or vertices to pixel coordinates is typically accomplished by a single graphics processor, which runs the line interpolation and polygon filling algorithms.

Virtually every stage in this architecture is a potential bottleneck. For example, the single processor has but one data path into the frame buffer for transferring of pixel data to the appropriate memory location in the buffer. Current state of the art for this architecture is typified by the Chromatics CX1536, a computer manufactured by Chromatics, Inc., of Tucker, Ga., which has a claimed performance of 500,000 vectors per second and 20 million pixels per second. Even this performance, however, is often slower than required for rotating and displaying images in scientific applications.

Presently, work is underway on several other system architectures to overcome the bottleneck imposed by a single graphics processor. None of these attempts, however, appear to be able to handle the data-intense applications required in scientific research. The most common strategy is to employ multiple processor designs. Typically in such a design, the graphics primitives from the host computer are broadcast to an array of processors, each responsible for one or a few pixels. The limiting case is one processor per pixel, of which a good example is the Pixel-planes system described by Fuchs et al. in "Fast Spheres, Shadows, Textures, Transparencies, and Image Enhancements in Pixel-Planes," *Computer Graphics*, Vol. 19, No. 3, 111–120 (July 1985). The Pixel-planes systems uses simple graphics processors connected to a multiplier tree so as to allow each processor to calculate a linear combination of pixel coordinates and to operate on its pixels accordingly. A less extreme example is provided by Gupta et al. in "A VLSI Architecture for Updating Raster-Scan Displays," *Computer Graphics*, Vol. 15, No. 3, 71–78 (August 1981). The authors there describe the use of 64 processors to manipulate an $8 \times 8$ block of pixels. Other closely related efforts involve modifying standard memory chips to write multiple cells simultaneously. For example, the Scanline Access Memory (SLAM) chip described by Demetrescu, "Moving Pictures," *Byte Magazine*, 207–217 (November 1985) (Scanline Access Memory) allows an indefinite number of pixels in a single scanline to be set in one memory cycle.

These multiple processor designs are examples of single instruction, multiple data (SIMD) parallel processing. Their ultimate speed is determined primarily by the number of pixels affected concurrently. If the number of pixels affected per cycle is large, then that throughput is high. However, since data intensive scientific applications tend to produce primitives containing only a few pixels, such as small polygons and short lines, these architectures are not very effective. For example, the Pixel-planes system performance is estimated at about 80,000 vectors per second, a factor of 100 slower than the performance required in complex scientific applications.

A further example of SIMD architecture in raster image generation is the Pixar IC2001 Image Computer, developed by Pixar Marketing, Lucasfilm Computer Division, San Rafael, Calif. This system uses a tesselated or checkered memory for providing simultaneous access through a crossbar switch to several channel processors which operate in SIMD mode. This architecture is optimized for algorithms in which the same set of operations is performed on each pixel in an image. It executes some algorithms quickly but is not particularly good at accessing pixels randomly as required for many scientific displays. Operations like basic line drawing are executed approximately 1 million pixels per second or slower.

Other multiple processor approaches have been proposed that do not have a SIMD architecture. For example, Parke, in "Simulation and Expected Performance of Multiprocessor Z-buffer Systems," *Computer Graphics*, Vol. 14, No. 3, 48–56 (July 1980) divides the monitor screen into blocks of pixels and allocates a separate processor to each. An incoming stream of graphics commands is partitioned so that each processor receives only commands that affect an associated area of the screen. This is a promising architecture, but it suffers from a need to interpret the data stream in order to divide it. For example, in the Parke approach a polygon overlapping two processors' areas is clipped into two pieces and only the appropriate part is sent to each processor. The polygon clipper becomes a bottleneck. This same problem exists with the so-called "pyramid" architectures, such as described by Tanimoto, "A Pyramidal Approach to Parallel Processing," Proceedings of the 10th Annual International Symposium on Computer Architecture, Stockholm (June 1983), ACM reprint 0149-7111/83/0600/0372.

All of the preceding architectures for raster graphics system use a fixed assignment of pixels to processors that presents a bottleneck to rapid display generation. This fixed assignment presents a dilemma. One approach is to require that the picture description be somehow partitioned so that each processor gets partial descriptions that affect only its pixels. Alternatively, each processor can read all graphics commands and spend considerable time processing data that it subsequently cannot use. In either case, the rate of display generation is too slow for many scientific applications.

It should be noted that the frame buffer itself does not impose a bandwidth limitation on its output that is difficult to overcome. Current frame buffer architecture already uses substantial parallelism, with the buffer partitioned across several memory units. This partitioning enables several pixel values to be accessed in parallel and clocked out serially through a shift register. This buffer is thus implemented as an interleaved memory, whose bandwidth can be increased by partitioning it more finely.

This same technique can be used on the input portion of the frame buffer to allow streaming pixel data into the frame buffer in scan-line order. Image processors such as the IP8500 system from Gould Inc., Imaging and Graphics Division, San Jose, Calif., for example, use an architecture similar to this. This technique provides extremely high pixel rates for operations performed in scan-line order. However, its speed for random pixel operations normally present in scientific applications is no better than the general pipelined architecture described above.

To eliminate the bottlenecks, a system architecture is needed that allows unrestrained mapping of any graphics processor output to any pixel in the graphics display. Each graphics processor within the system must be able to process any part of the graphics command stream from the host computer and transfer the resulting pixel data to the appropriate pixel location in the frame buffer without delay.

SUMMARY OF THE INVENTION

An object of the invention therefore is to provide an improved raster graphics system architecture for more rapidly generating raster images.

Another object of the invention is to provide such an architecture that allows any of a plurality of graphics processors to access any pixel in a graphics display.

Still another object of the invention is to enable the graphics processors to operate concurrently in accessing any pixel location in the frame buffer to provide for the rapid generation of raster images.

Still another object of the invention is to provide a multiple instruction multiple data (MIMD) graphics system architecture in which a plurality of graphics processors are adapted to process on a first-free basis the parts of a graphics command stream received from a host computer.

To achieve these objects, an apparatus for generating raster graphics images from the graphics command stream includes a plurality of graphics processors each adapted to receive any part of the graphics command stream for processing the command stream part into pixel data. The apparatus also includes a frame buffer for mapping the pixel data to pixel locations and an interconnection network for interconnecting the graphics processors to the frame buffer. Through the interconnection network, each graphics processor may access any part of the frame buffer concurrently with another graphics processor accessing any other part of the frame buffer. The plurality of graphics processors can thereby transmit concurrently pixel data to pixel locations in the frame buffer. This concurrent transmission of pixel data avoids the pixel writing bottleneck inherent in prior art raster graphics systems.

The apparatus also includes interface means for dividing the graphics command stream into parts comprising primitives. The interface means then directs each primitive to a graphics processor available for processing the primitive into the pixel data on a first-free basis.

In the disclosed embodiment, the interconnection network comprises a packet switching network. The graphics processors are adapted to transmit the pixel data in addressed data packets to the interconnection network for routing to the addressed parts of the frame buffer. The network itself comprises a plurality of routing nodes providing a route from each graphics processor to any part of the frame buffer. Each routing node includes means for queuing at the node the pixel data intended for a part of the frame buffer until a link is available from the node to another node along the route to the intended part of the frame buffer.

The foregoing and other objects, features, and advantages of the invention will become more apparent from the following detailed description of preferred embodiments which proceeds with reference to the accompanying drawings.

DETAILED DESCRIPTION

Overview of the System Architecture

Figure 1:
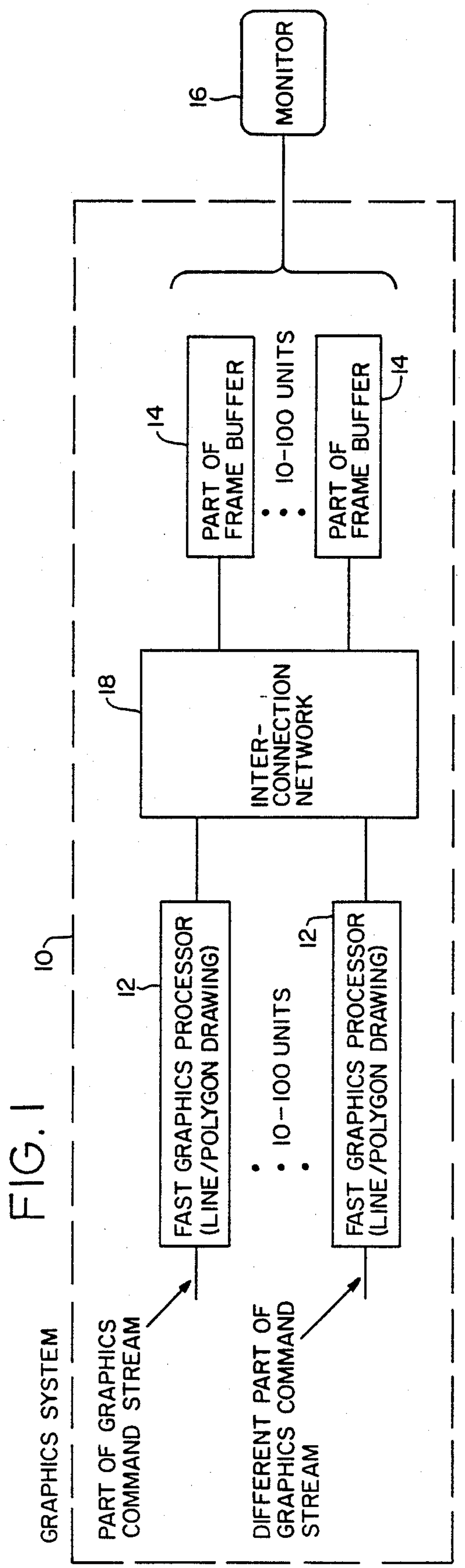
FIG. 1 is a block diagram of a raster graphics system according to the invention.

The graphics system architecture of the present invention is based on multiple graphics processors, operating in parallel, with an unconstrained mapping of processors to pixels. The architecture of graphics system 10 is outlined in FIG. 1. Referring to the left part of the figure, a plurality of graphics processing means such as fast graphics processors 12 are shown. Each of the processors 12 is adapted to receive any part of a graphics command stream such as primitives for processing the command stream part into pixel data for drawing of lines, polygons, filling, etc. The graphics command stream originates from a host computer or processor (not shown) and may be passed to the graphics processors through an interface, which will be described. On the right side of the figure is shown parts of a conventional frame buffer 14 that map pixel data to memory locations corresponding to pixels for display on a device such as a monitor 16. Set between the processors 12 and frame buffer 14 is an interconnection network 18. The network 18 enables each graphics processor 12 to access any part of the frame buffer 14 concurrently with another graphics processor 12 accessing any other part of the frame buffer 14. The plurality of processors 12 are thereby able to transmit concurrently pixel data to memory locations in the frame buffer 14 that correspond to pixel locations in the graphics display.

As indicated in FIG. 1, each of the graphics processors 12 is connected independently to the input side of the interconnection network 18. On the output side of the interconnection network 18, multiple independent data paths are provided to the various parts of the frame buffer 14 to allow each of the graphics processors 12 to write to each memory location in each frame buffer part. This interconnection provides large aggregate bandwidth and eliminates the pixel writing bottleneck.

The system architecture is adapted to divide the graphics command stream into parts that can be processed independently and simultaneously by each of the processors 12. For example, if it is known that no command stream parts such as primitives overlap in an image, then each primitive is simply assigned to the processor 12 that is next available. This assignment rule is followed even if primitives may overlap so long as the order of pixel writing is irrelevant, such as if all primitives are of the same color. In most two dimensional applications, the order of writing is important only between phases, e.g., axes first, then data. In such cases, the overlap is handled by allowing the monitor 16 to complete each phase before starting the next by flushing the monitor buffer when switching between text and graphics.

Figure 2:
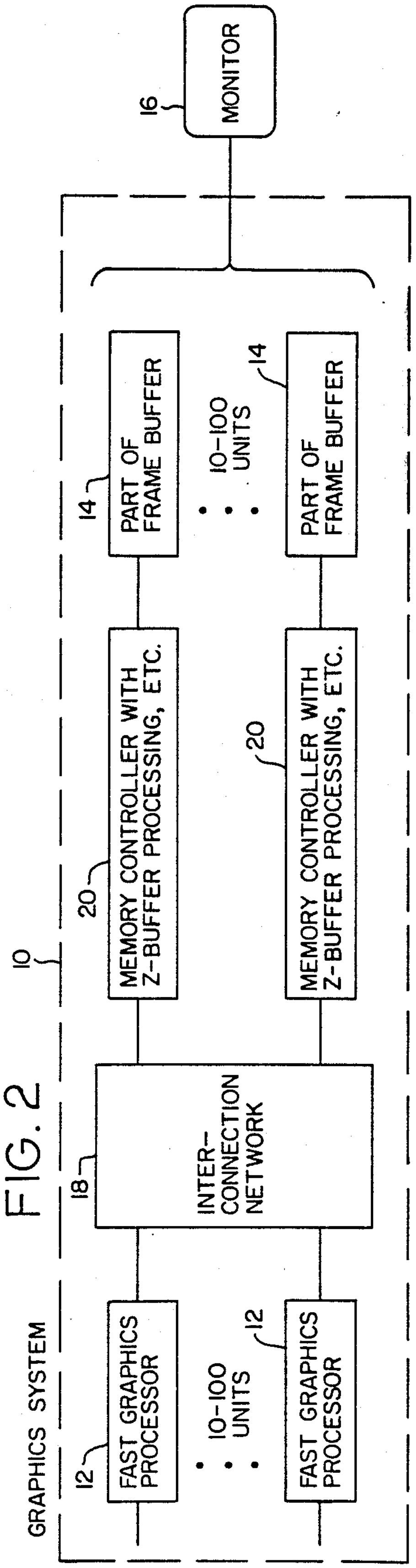
FIG. 2 is an extension of the block diagram of FIG. 1 showing an additional element for performing hidden surface calculations.

Three dimensional hidden surface applications can be handled as follows. Referring now to FIG. 2, the system 10 includes for each part of the frame buffer 14 a memory controller/Z-buffer 20. The Z-buffer visibility algorithm is well known and amply described in Foley et al., "Fundamentals of Interactive Computer Graphics," Addison-Wesley (1983). Prior frame buffers, however, can accept only a single Z-buffer. For each primitive, for each pixel covered by that primitive, a new color and depth is computed, but only if the new depth is closer to the surface than previously written depths. In FIG. 2, each graphics processor 12 computes a stream of new pixel values and depths for the primitives it is working on, and then sends these values via the interconnection network 18 and memory controllers 20 to the appropriate part of the frame buffer 14. Each part of the frame buffer reads the old pixel depth, compares it to the new, and stores new depth and color if appropriate.

Other hidden surface algorithms may be supported by the system architecture as well. For example, the A-buffer algorithm, taught by Carpenter in "The A-buffer, an Antialiased Hidden Surface Method," *Computer Graphics*, Vol. 18, No. 3, 103–108, provides simultaneous antialiasing and visibility termination. It can be adapted to the architecture of the system 10 as follows. The graphics processors 12 compute polygonal fragments that are "flat on the screen," fill these fragments, and send the resulting pixel coverage information through the interconnection network 18 to the memory controllers 20. These steps are done for each polygon independently; no communication is required between graphics processors 12. Upon arriving at the memory controllers 20, the pixel coverage information is buffered as described by Carpenter. After all graphics processors 12 are finished, memory controllers 20 sort the pixel fragment information and determine the final visibility and colors. This is done for each pixel independently; again no communication is required between memory controllers 20.

The Interconnection Network

Figure 3:
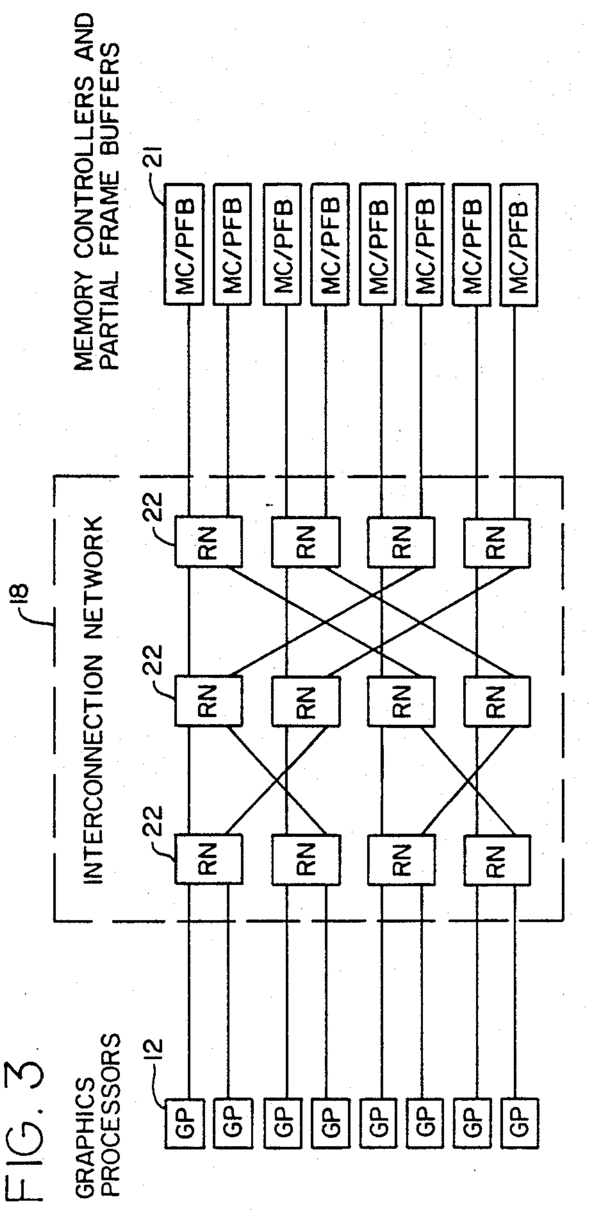
FIG. 3 is a block diagram of an interconnection network within the raster graphics system of FIG. 1.

Referring now to FIG. 3, there is shown a block diagram of an interconnection network 18 that has multiple input and output data paths. Each input data path connects to a graphics processor 12 for receiving pixel data therefrom. Each output data path connects to a combined memory controller/frame buffer unit 21 that comprises a memory controller 20 matched with part of the frame buffer 14. The data path routes the pixel data to the appropriate memory location in the buffer 14. Each input and output data path is connected via a number of two input-two output routing nodes 22 and internal data paths therebetween. In this embodiment, the network 18 comprises a packet switching network having three levels of network nodes. Packets containing destination address (i.e., pixel location) and corresponding data (e.g., function code, pixel value, Z-value) are prepared by the graphics processors 12 and sent into the network 18 along input data paths. At each node 22 within the network 18, the address field of a packet is examined to determine the routing to the appropriate memory location in the frame buffer 14. Each node 22 contains enough buffering to hold an entire packet. Packets traverse the network 18 in pipeline fashion, being clocked from one network node level to the next. If two requests requiring the same routing at a routing node 22 arrive simultaneously, one of the packets is queued at that node until the required internal data path to another node or output path to a frame buffer part 14 becomes available. Having packets queued at each node 22 independently causes conflicts to have only a local effect and preserves the bandwidth of the network 18.

The network of the present embodiment requires N/2* log N (base 2) routing nodes to support N processors and N memories. Thus, to support a 128-processor system requires 448 routing nodes 22. In general, a network 18 such as this can become quite complicated because of the need to protect against asynchronous updating and to preserve system bandwidth in the event of many simultaneous references to the same memory location in the frame buffer. The present embodiment has two characteristics, however, that allow the system to be simplified. First, pixel data need only be written to the frame buffer 14 and not read back from the buffer to the graphics processors 12. Secondly, accesses in general to the routing nodes statistically tend to be uniform across memory locations in the frame buffer 14. These characteristics together allow the network to be implemented as a fast, pipelined design comprising single chip routing nodes as will be further described.

Host Interface

Figure 4:
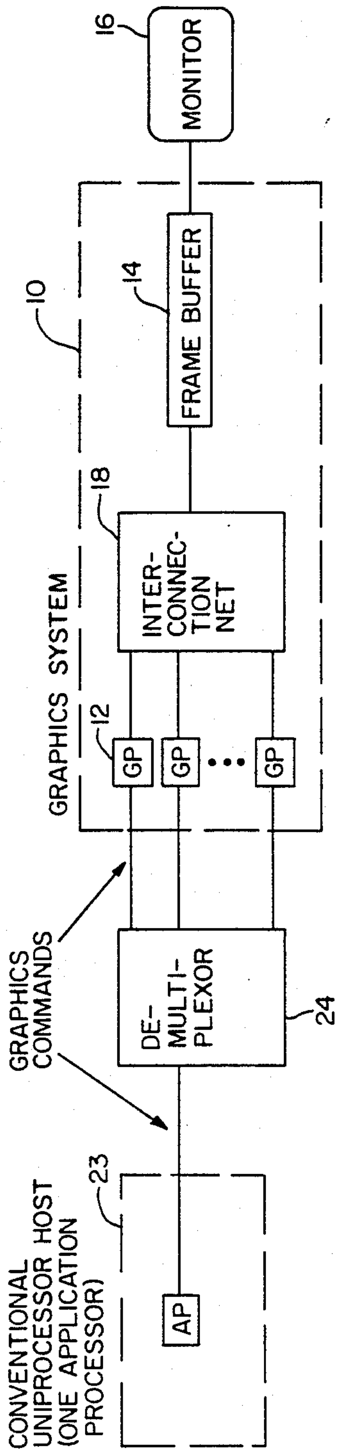
FIG. 4 is a block diagram of a conventional uniprocessor host, the raster graphics system, and the interface between them.

The system architecture of the present invention provides more flexibility in host interfacing to a graphics system than conventional architectures allow. FIG. 4 illustrates one embodiment of a host interface for interfacing a conventional uniprocessor host 23 (one application processor) to the system 10 over a single channel. In this case, the single graphics instruction stream is demultiplexed by an interface comprising a demultiplexor 24, with independent primitives being assigned on a first-free basis to the various graphics processors 12. Individual primitives can be recognized as is known in the art by header or trailer fields. The single channel and demultiplexor impose a potential pixel writing bottleneck. However, the function of the demultiplexor is simple enough that fast chip technology can minimize the bottleneck impact.

Figure 5:
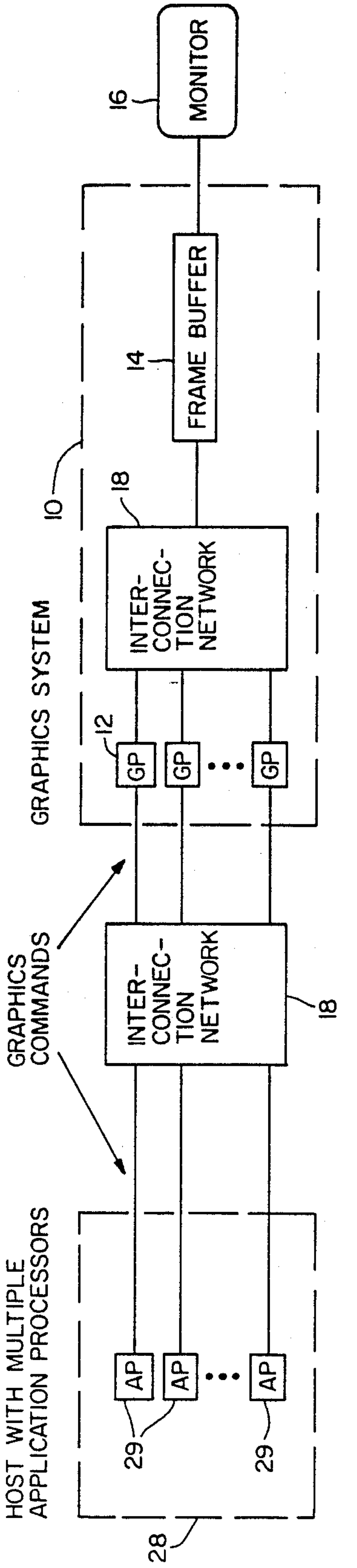
FIG. 5 is a block diagram of a multiprocessor host, the graphics system, and interface between them.

A second embodiment of the host interface is shown in FIG. 5, for use with a multiprocessor host 28. The graphics system 10 therein is driven by the host 28 via multiple data paths each with a separate graphics command stream. A second interconnection network 18 can be utilized to connect each application processor 29 within the host 28 with any of the graphics processors 12. In the simplest case, the interface can be eliminated and each application processor 29 within the host 28 is paired with a graphics processor 12. The individual channel connections in this embodiment can be much slower than in the previous embodiment and still provide the required aggregate bandwidth. The ultimate number of graphics processors is much higher, leading to faster image generation.

System Implementation

The described system has the ability to run 10 to 100 times faster than presently commercially available equipment. Systems specifications include 3 million 3-D triangles per second with hidden surface removal, 10 million vectors per second, and 100 million pixels per second, 1024×1280 resolution and 24-bit pixels.

The basic system architecture relies on three types of functional units: the graphics processors 12, the interconnection network 18, and the controller/buffer unit 21. Because of the extensive parallelism, none of these units need to be particularly fast. For example, with 150 functional units and the interconnection described, system specifications can be achieved with the following performance from the individual units:

Graphics processors:

30 thousand triangles per second per processor, 100 thousand vectors per second per processor, 1 million pixels per second per processor.

Network routing nodes:

1 million packets per second per port (two ports input and two ports output per node).

Controller/buffer units:

1 million pixels per second per controller/buffer port.

Graphics processors 12 providing this performance include the XTAR GMP processor chip manufactured by XTAR Electronics, Inc., of Elk Grove, Ill., and the Texas Instruments TMS34010 processor chip. The XTAR GMP chip runs at 100 thousand vectors per second with a nominal draw rate of over 10 million pixels per second. The TMS34010 chip has a slower draw rate, around 1 million pixels per second but is fully programmable. Programmability permits application-specific optimization of the system 10.

The network routing nodes 22 within the network 18 may be implemented as single microchips using current technology. The critical parameters to evaluate are pin count, speed, and internal complexity. These are determined by the size of the data packets (data+address). A packet of 80 bits, for example, provides 24 bits of address to support a 4 K×4 K pixel display, 24 bits per pixel value (providing 8 bits each for red, green, and blue), and 32 bits of Z-level for hidden surface removal. With such a packet, each writing node 22 must be capable of passing 80 million bits per second (80 bits per packet, 1 million packets per second) on each of two input and two output ports.

Figure 6:
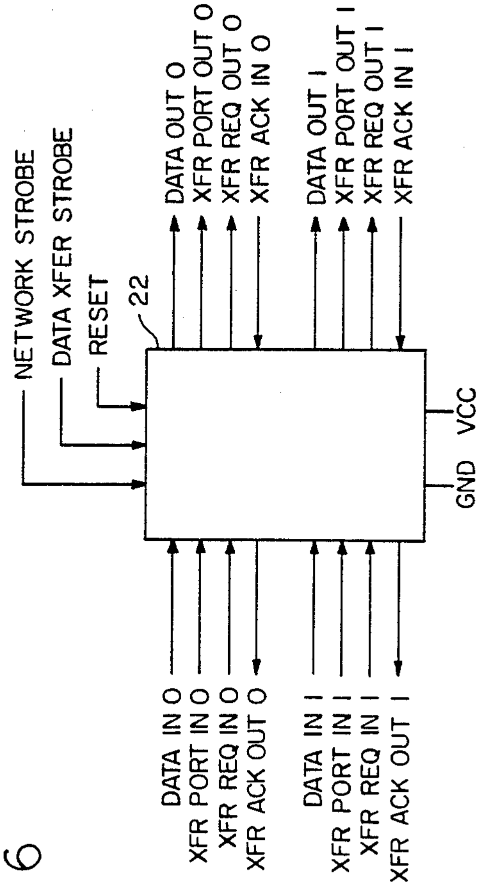
FIG. 6 is a block diagram of a routing node within the interconnection at work of FIG. 3.

FIG. 6 shows a diagram of the signals sent and received by a node 22. The two input and two output ports are shown. Each input port has a data path (DATA IN) several bits wide and three control signals XFR PORT IN, XFR REQ IN, and XFR ACK OUT, for requesting the direction of routing and for synchronizing the transfer of data. Each output port has corresponding signals including DATA OUT, XFR PORT OUT, XFR REQ OUT, and XFR ACK IN. The data path is 8 bits wide, with an 80-bit packet being transferred in 10 clock cycles. A standard 68-pin square chip provides enough pin count, and a 10 MHz data transfer clock allows for 1 million transfers per second. The XFR REQ and XFR ACK indicate, respectively, that a data transfer is requested and acknowledged. The XFR PORT IN specifies this node, with XFR PORT OUT specifying the routing of data to the next network level. Once the packet has been fully buffered into the node, its output field is interpreted and XFR PORT OUT is set. In addition to the port signals, the node 22 has three other signals for transferring data through the node. The NETWORK STROBE signal synchronizes the entire network with respect to initialization and packet transfers. The DATA XFER STROBE clocks the actual data transfer. The RESET signal clears the node of data.

Figure 7:
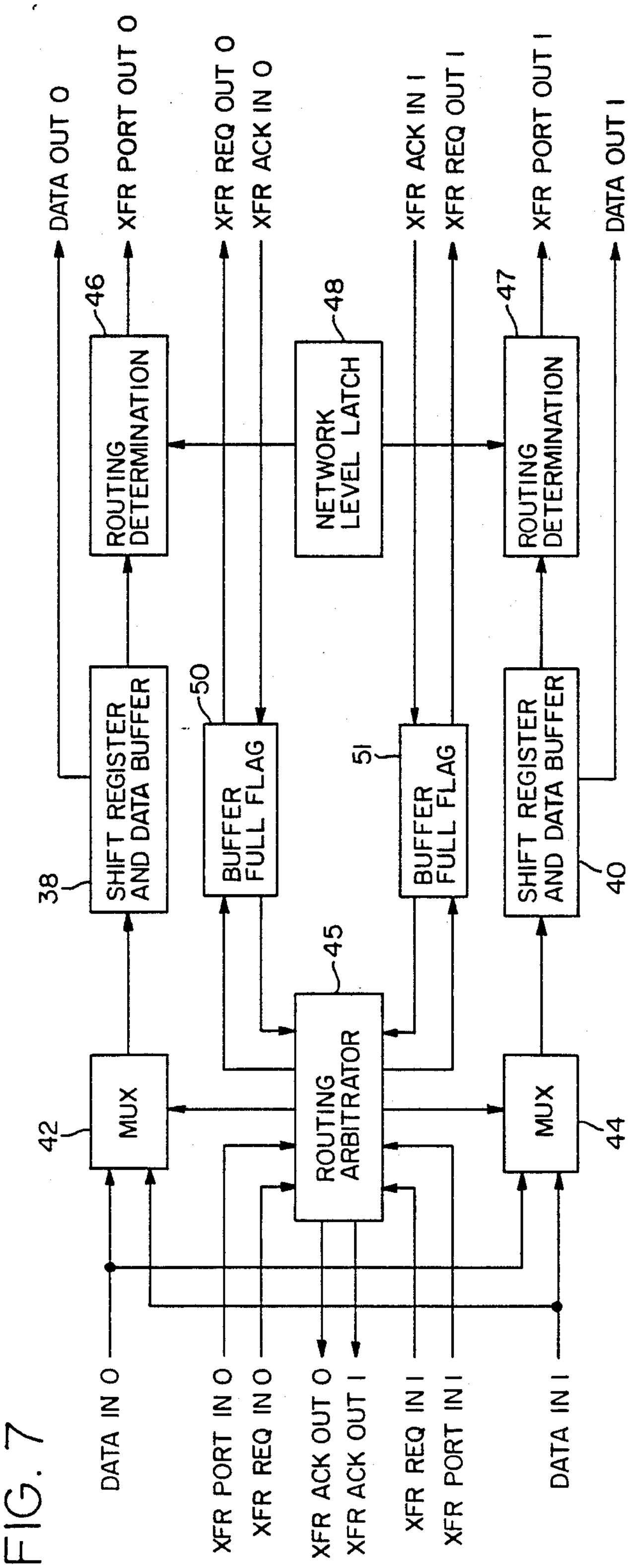
FIG. 7 is a block diagram of the internal structure of the routing node of FIG. 6.

FIG. 7 is an internal block diagram of one embodiment of a routing node 22. Incoming data from each input port is buffered in parallel shift registers 38 and 40 as wide as the I/0 data paths and as long as necessary to hold the packet, typically 8 bits wide and 10 stages long. The shift register for each input port is coupled to multiplexors 42 and 44 so that the input data can be routed to either shift register for transfer through an associated output port. Output port selection is determined by the packet address bits that are read by routing arbitration logic 45 which controls the routing of data through multiplexors 42 and 44. The arbitration logic 45 also acknowledges request for data transfer and synchronizes the multiplexors to the data transfer signal. The leading bits of the data stored in each register 38 and 40 are evaluated by associated routing determination logic 46, 47 to generate XFR PORT OUT to the next node. The network level latch 48 resets the determination logic 46, 47. The buffer full flags 50, 51 tell the node to queue the data in the respective register 38 or 40 until a desired routing path is clear.

The memory controller 20 has several tasks including unconditionally writing pixel values, reading and modifying pixels, reading and conditionally writing pixels based on Z-level, and reading pixels for screen refresh. A typical controller/buffer unit 21 may incorporate one controller chip, six 64 K×4-bit video RAM chips, and a four 32 K×8-bit standard RAM chips. This combination provides double buffering for 32 K pixels at 8 bits each for red, green, and blue and a 32-bit Z-value for each of the 32 K pixels, accessible in a single memory cycle in both cases. With this allocation, 40 units of controller/buffer unit 21 provide enough memory to refresh a 1024×1280 display while writing pixels at 100 million pixels per second.

This configuration permits only Z-buffering. To support A-buffering, substantially more memory is required, perhaps provided by eight or sixteen 256 K×4-bit. RAM chips.

Host Interface

As shown in FIGS. 3 and 4, different types of host interfaces are required depending upon the number of independent channels into the host. In the case of a single host channel, the host interface is a fast demultiplexor, as described, dividing the stream of graphics commands into identifiable individual primitives and parceling them out to the graphics processors on a first-free basis. A data bus with fast priority arbitration network between free processors may be used; a token ring architecture could also work.

The host interface may also take the form of multiple host channels 12 shown in FIG. 5. Two interfaces are possible, depending on the speed requirements. One interface is simply a multiplexor to multiplex the output from all host channels onto a single fast channel and then demultiplex the output as previously described. Alternatively, as described, an interconnection network 18 could be used for routing primitives based on processor 12 availability.

Monitor Interface

In the interface to the monitor 16, pixel values coming from the controller/buffer units 21 are interleaved appropriately and may be fed into color/intensity lookup tables and digital-to-analog converters, as is conventionally done. The only difference between the frame buffer in the architecture of system 10 and in conventional high resolution color systems is a higher level of interleaving. Conventional high resolution color systems typically use 16-way interleaving. With forty controller/buffer units 21 the architecture would use forty way interleaving. The aggregate data is the same, however, since the number of pixels on the screen of the monitor 16 is the same.

Figure 8:
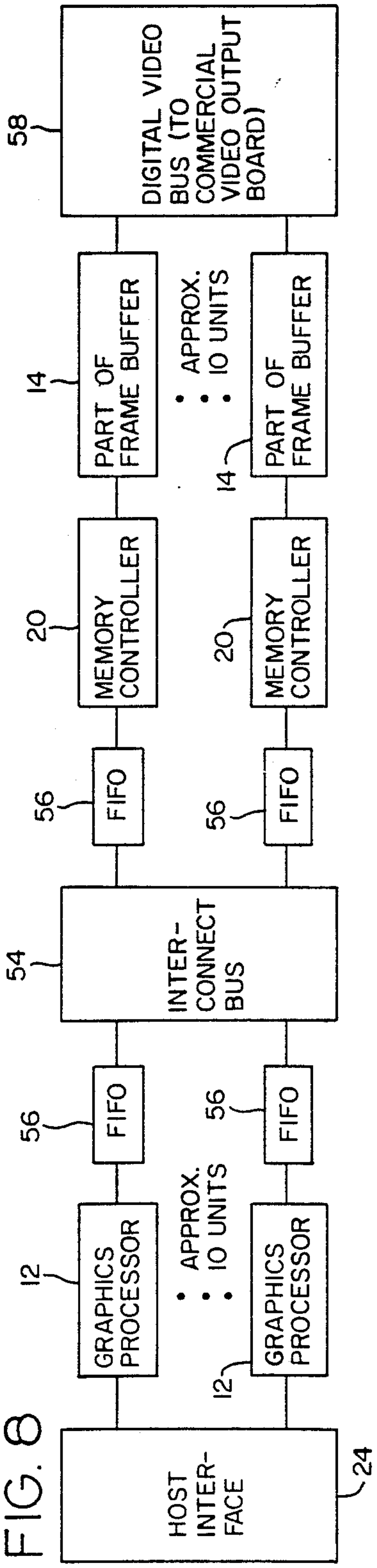
FIG. 8 is a more detailed embodiment of the graphics system of FIG. 1.

FIG. 8 shows another embodiment of the graphics system 10 designed for display parameters of 512×640 pixels, 24-bit pixels with Z-buffer and a double buffered display. In this case, ten memory parts of the frame buffer 14 are appropriate. In particular, a bus-oriented system, as illustrated in FIG. 8, can be used. This system 10 is using a slightly modified VME bus 54. By placing first in first out (FIFO) queues 56 on the bus interface of each functional unit in the system, message transfers can be done in large blocks. This avoids frequent bus arbitration and allows the net transfer rate to be essentially the same as the bus rate (on the order of 100 nanoseconds per transfer). The interconnection bus 54 is chosen to be wide enough to transmit an entire packet in parallel (e.g., 80 bits). The pixel data from the parts of the frame buffer 14 are transferred to the monitor 16 via a conventional digital video bus 58.

Having illustrated and described the principles of the invention in preferred embodiments, it should be apparent to those skilled in the art that the invention can be modified in arrangement and detail without departing from such principles. I claim all modifications coming within the spirit and scope of the following claims.

I claim:

1. Apparatus for generating raster graphics images from a graphics command stream, comprising:

a plurality of graphics processing means each adapted to receive any part of the graphics command stream for processing the command stream part into pixel data;

frame buffer means for mapping the pixel data to pixel locations; and a unidirectional interconnection network having multiple levels of linked nodes to provide a data path from each graphics processing means to any part of the frame buffer means, each node at one level including means for queuing at the node pixel data intended for a part of the frame buffer until a link is available from the node to a node at another level.

2. The apparatus of claim 1 including interface means for dividing the graphics command stream into parts comprising primitives, the interface means directing each primitive to a graphics processing means available for processing the primitive into the pixel data.

3. The apparatus of claim 1 in which the interconnection network comprises a packet switching network and the graphics processing means are adapted to transmit the pixel data in an addressed data packet to the network for routing to the addressed part of the frame buffer means.

4. Apparatus for generating raster graphics images from a graphics command stream, comprising:

a plurality of graphics processing means, each adapted to receive any part of the graphics command stream for processing the part into pixel data;

interface means for dividing the graphics command stream into parts comprising primitives and for directing each primitive to a graphics processing means available for processing the primitive into the pixel data;

frame buffer means for mapping pixel data to pixel locations; and a unidirectional interconnection network for enabling each graphics processing means to access any part of the frame buffer to transmit pixel data to any pixel location in the buffer.

5. The apparatus of claim 4 in which each graphics processing means comprises a separate graphics processor.

6. The apparatus of claim 4 in which the graphics command stream originates from a host and the interface means comprises a demultiplexor between the host and plurality of graphics processing means.

7. The apparatus of claim 4 in which the graphics command stream originates from a host and the interface means comprises a priority arbitration network between the host and the plurality of graphics processing means to parcel out primitives to the processing means on a first-free basis.

8. The apparatus of claim 4 in which the graphics command stream originates from a multiprocessor host and the interface means comprises an interconnection network between the host and the plurality of graphics processing means.

9. The apparatus of claim 4 in which the interconnection network comprises a plurality of linked nodes, each of which includes:

a pair of shift registers, each register receiving packets of pixel data and transmitting the packets to a linked node;

a pair of multiplexors, each multiplexor connected to a shift register and a pair of input ports that provide the packets of pixel data;

routing arbitration logic for controlling the multiplexors, the arbitration logic reading packets at each input port to determine which shift register is to receive the packet; and flag means for alerting the node to queue the received packet in the shift register until the linked node is ready to receive a transmission from the register.

10. In a raster graphics system, a method for generating raster graphics images from a graphics command stream, comprising:

dividing the graphics command stream into primitives;

processing the primitives through a plurality of graphics processors concurrently into pixel data having addresses in a frame buffer, each primitive being directed to an available graphics processor;

transmitting the pixel data concurrently to addressed parts of the frame buffer; and reading the frame parts in interleaved fashion to generate raster graphics images.

* * * * *

UNITED STATES PATENT AND TRADEMARK OFFICE

CERTIFICATE OF CORRECTION

PATENT NO. : 4,949,280

DATED : August 14, 1990

INVENTOR(S) : Richard J. Littlefield

It is certified that error appears in the above-identified patent and that said Letters Patent is hereby corrected as shown below: Title page:

[56] Other Publications:

Line 12, "Tanimotor" should be --Tanimoto--.
Line 9, "on" should be --of--.

Column 9, line 10, delete the "." between words "4-bit" and "RAM".

Signed and Sealed this

Twenty-first Day of July, 1992

*Attest:*

DOUGLAS B. COMER

*Attesting Officer* *Acting Commissioner of Patents and Trademarks*